United States Patent [19]

Slezak

[11] Patent Number: 4,534,456
[45] Date of Patent: Aug. 13, 1985

[54] HYDRODYNAMIC POWER TRANSMISSION UNIT

[75] Inventor: Paul J. Slezak, Pierrefonds, Canada

[73] Assignee: KHD Canada, Inc., Montreal, Canada

[21] Appl. No.: 413,153

[22] Filed: Aug. 30, 1982

[30] Foreign Application Priority Data

Apr. 3, 1982 [DE] Fed. Rep. of Germany ....... 3212505

[51] Int. Cl.³ .................... F16D 33/16; F16D 33/20
[52] U.S. Cl. .................................. 192/58 A; 60/330; 60/339
[58] Field of Search ............... 192/58 A, 58 B, 58 R; 60/330, 339

[56] References Cited

U.S. PATENT DOCUMENTS

| Re. 24,988 | 5/1961 | Edmonson | 60/330 |
| 2,753,966 | 7/1956 | Ranzi | 192/58 A |
| 4,301,906 | 11/1981 | Shirai | 192/84 C |

FOREIGN PATENT DOCUMENTS

| 587616 | 10/1933 | Fed. Rep. of Germany | 192/58 |
| 921181 | 10/1954 | Fed. Rep. of Germany | |
| 56-6950 | 1/1981 | Japan | 60/339 |
| 412412 | 8/1974 | U.S.S.R. | 60/330 |

Primary Examiner—Rodney H. Bonck
Attorney, Agent, or Firm—Watson, Cole, Grindle & Watson

[57] ABSTRACT

A hydrodynamic power transmission unit is constructed with cylindrical bearings positioned in the annular space between the outer hollow driver shaft and the concentrically disposed inner driven shaft and flow channels are provided to not only supply lubricating oil to the cylindrical bearings independently of the drive fluid supplied to the impeller and turbine discs but also to remove the spent lubricating oil in a way that it does not mix with the drive fluid. The resultant transmission unit, which can be used as a clutch for driving the cooling fan of an internal combustion engine, is more reliable and less expensive than prior art transmission units, and less noisy.

9 Claims, 2 Drawing Figures

HYDRODYNAMIC POWER TRANSMISSION UNIT

BACKGROUND OF THE INVENTION

1. Field of the Invention

The present invention relates to hydrodynamic power transmission units in which the torque of a rotating drive shaft is transmitted to a shaft to be driven by a drive fluid.

2. The Prior Art

Hydrodynamic power transmission units are well known elements in all types of transportation vehicles, including automobiles, trucks, buses, airplanes, etc. Also known as fluid clutches, these units can be, for example, connected to drive the cooling fan of an air-cooled internal combustion engine (e.g. a diesel engine) at a controlled speed based on the operating characteristics of the engine. As shown in German Pat. No. 921,181, the drive fluid can be injected in metered quantities from a storage container into the clutch as required. However, since the amount of drive fluid which is in contact with the operating parts of the clutch is critical, it is necessary to prevent any lubricating oil which may be used in the bearings of the clutch from mixing with the drive fluid. Thus, most clutches are made with bearings which do not require the use of lubricating oils, such as roller bearings or needle bearings. But these types of bearings are easily contaminated and not adequately wear resistant, as well as quite expensive. And clutches made with such bearings tend to be noisy.

It is thus an object of the present invention to provide a hydrodynamic power transmission unit which can be made with readily available, low cost and highly resistant bearings.

It is also an object of the present invention to provide a low noise hydrodynamic power transmission unit in which lubricating oil is supplied to the bearings therein separately from the supply of drive fluid and in which the spent lubricating oil is removed from the bearings in a way that intermixing with the drive fluid in the clutch is prevented.

It is furthermore an object of the present invention to provide a hydrodynamic power transmission unit in which the same fluid can be used as both the drive fluid and the lubricating oil for the bearings.

SUMMARY OF THE INVENTION

According to the present invention the hydrodynamic power transmission unit includes a housing, a hollow drive shaft which is located in the housing, an impeller disc which is connected to extend radially outwardly from the drive shaft, a driven shaft which extends into the housing so as to be concentric with the hollow drive shaft, and a turbine disc which is connected to extend radially outwardly from the driven shaft so as to be located in cooperative relationship with the impeller disc. Each of the impeller disc and the turbine disc include peripherial head portions with cup-shaped cross sections which face one another and have blades therein. A cover extends from the outer periphery of the head portion of the turbine disc to enclose the impeller disc and provide an annular chamber, and an injector nozzle is removably positioned in an opening in the cover to enable the drive fluid to be injected into the annular chamber so as to control the operation of the clutch. In the annular space between the drive shaft and the driven shaft are positioned cylindrical bearings which support the drive shaft and enable relative rotational movement between the two shafts.

The various parts of the inventive transmission unit are constructed to enable pressurized lubricating oil to be supplied to the annular space between the two shafts and thus to lubricate the cylindrical bearings therebetween, as well as the bearings used to mount the driven shaft in the housing, and to remove the spent lubricating oil in such a way that it does not mix with the drive fluid between the head portions of the impeller and turbine discs. Thus the turbine disc will not begin rotating, based on the rotation of the impeller disc, when such rotation is not intended.

In one embodiment of the present invention the driven shaft will include a central bore and multiple radial passages, such that pressurized lubricating oil supplied to the central bore will pass through the radial passages to the annular space between the drive shaft and the driven shaft and to the cylindrical bearings therebetween (as well as to the bearings mounting the driven shaft in the housing). In addition, the impeller disc can be constructed to include an annular recess, as well as multiple ports which communicate between the annular recess and the chamber between the turbine disc and the housing, while the inner base portions of the impeller and turbine discs can be configured to provide circumferentially located flow passages which extend between the annular space between the two shafts and the annular recess in the turbine disc. These flow passages can be formed to include first, radially-extending portions and second, angled portions, and the flow passages, together with the ports in the turbine disc, may be shaped to provide a gradually increasing cross section for the spent lubricating oil passing therethrough. In a particularly preferred embodiment of the present invention the circumferentially located flow passages will be instead a single annular passage.

A further understanding of the present invention will be had by reference to the accompanying drawings, taken in conjunction with the following discussion.

DETAILED DESCRIPTION OF THE PREFERRED EMBODIMENT

Figure 1:
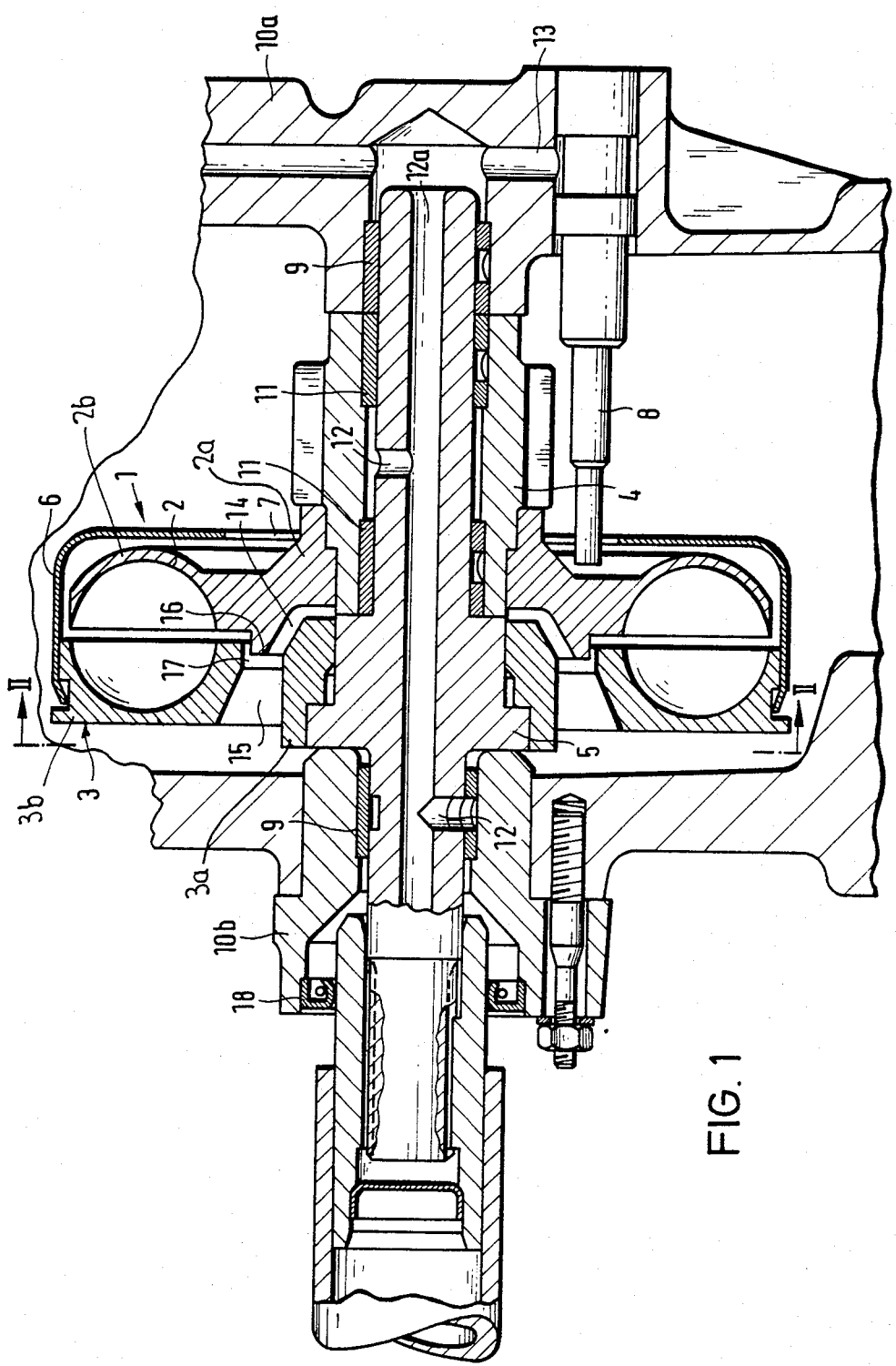
FIG. 1 shows an axial cross section of a hydrodynamic power transmission unit constructed in accordance with the present invention.

The inventive hydrodynamic power transmission unit is shown in FIG. 1 in the form of a clutch 1 for controlling the rotation of a cooling fan for an internal combustion engine based on the operating characteristics of the engine.

The clutch 1 includes a driven shaft 5 which is mounted by cylindrical mounting bearings 9 for rotational movement in parts 10a, 10b of a housing (not shown in its entirety) which surrounds the clutch, as well as an outer hollow drive shaft 4 which is concentric with a portion of the driven shaft 5. The driven shaft 5 is adapted to rotate the cooling fan (not shown) of the engine while the drive shaft 4, which is in the form of a gear wheel, is intended to be rotated by the internal combustion engine (not shown). Cylindrical bearings 11 are positioned in the annular space between the driven shaft 5 and the drive shaft 4 in order to support the drive shaft 4 and allow the two shafts to rotate relative to one another.

Extending radially outwardly from the drive shaft 4 is an impeller disc 2, and extending radially outwardly from the driven shaft 5 is a complementary turbine disc 3. The impeller disc 2 is fixedly connected to the drive shaft 4 so that rotation of the drive shaft 4 will cause rotation of the impeller disc 2, while the turbine disc 3 is similarly fixedly connected to the driven shaft 5 so that rotation of the turbine disc 3 (due to fluid action caused by rotation of the impeller disc 2) will cause rotation of the driven shaft. The impeller disc 2 is shaped to include a base portion 2a and a peripheral head portion 2b which has a cup-shaped cross section. The turbine disc 3 is similarly shaped to include a base portion 3a and a peripheral head portion 3b, which has a cup-shaped cross section. The head portions 2b and 3b are bladed and face one another, leaving a space therebetween, as is conventional. A cover 6 is connected to the periphery of the head portion 36 of the turbine disc 3 and extends over and around the impeller disc 2 to provide an annular chamber for the collection of drive fluid. This drive fluid is injected into the annular chamber in controlled amounts by an injector nozzle 8 which removably extends through an annular opening 7 in the cover 6. This mode of drive fluid injection, which is controlled based on the operating characteristics of the engine, is itself well known. The fluid which accumulates in the cover 6 can be drained away by a common collector (not shown).

The driven shaft 5 is provided with a central bore 12a and radial passages 12. A feed line 13 in the housing part 10a delivers pressurized lubricating oil from a container (not shown) (this container can be the same one which supplies the drive fluid) to the central bore 12a, and from there the pressurized lubricating oil passes through the radial passages 12 to the annular space between the shafts to lubricate the bearings 9 and 11.

The facing sides of the base portions of the impeller disc 2 and turbine disc 3 are fashioned to provide a single annular flow passage 14 which extends outwardly away from the annular space between the shafts 4 and 5 to remove the spent pressurized lubricating oil. This spent oil is otherwise prevented from escaping from between the shafts by sealing rings 18 which are positioned between the driven shaft 5 and the housing part 10b.

The annular flow passage 14 includes a first portion which communicates with the space between the shafts on the impeller side of an imaginary plane which separates the head portions of the discs 2 and 3 and then extends radially outwardly therefrom, and a second portion which is angled toward the hub portion of the head portion of the turbine disc to communicate with an annular recess 17 in the base portion of the turbine disc. In addition, the base portion of the impeller disc 2 includes a rib 16 which axially extends into the annular recess 17 in the base portion of the turbine disc to a point on the opposite side of the previously noted imaginary plane. The angled portion of the annular flow passage 14 communicates with the annular recess 17 beneath (radially inwardly) of the rib 16 and on the turbine disc side of the imaginary plane.

Figure 2:
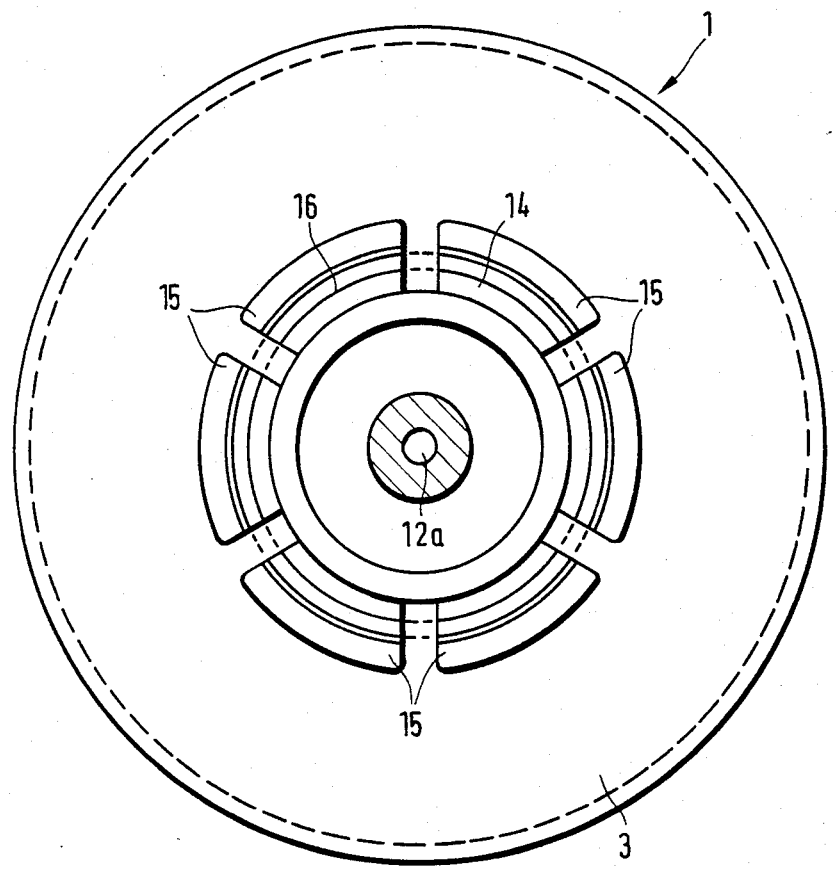
FIG. 2 shows a radial cross section of the inventive hydrodynamic power transmission unit as seen along line II-II in FIG. 1.

The base portion of the turbine disc 3 also includes a number of circumferentially elongated ports 15 which extend between the annular recess 17 and the drainage chamber between the turbine disc and the housing part 10b. These ports 15 are best seen in FIG. 2. The annular passage 14 and the ports 15 may be formed to gradually increase in cross section, i.e., in the direction of oil flow therein (away from the shafts 4, 5).

After the spent pressurized lubricating oil has passed through the ports 15, it exits through radial passageways between the turbine disc and the housing part 10b and is collected in the housing, together with the drive fluid which has drained out of the cover 6. This is possible because of the fact that the pressurized lubricating oil and the drive fluid can be the same—they can originate from the same container, be used in the clutch, and then be collected in the same receiving means.

Although a preferred embodiment of the invention has now been explained in detail, various modifications can be made therein and still fall within the scope of the appended claims.

We claim:

1. A hydrodynamic power transmission unit which comprises a housing; a hollow drive shaft which is mounted in the housing for rotation; a driven shaft which extends into the housing and is mounted on mounting bearings so as to be rotatable with respect thereto, said driven shaft extending through and being concentric with said drive shaft so as to provide an annular space therebetween; a number of cylindrical bearings positioned in said annular space between said drive shaft and said driven shaft; an impeller disc which is connected to said drive shaft to extend radially outwardly therefrom, said impeller disc including a base portion and a head portion, said head portion of said impeller disc having a cup-shaped cross section and blades therein; and a turbine disc which is connected to said driven shaft to extend radially outwardly therefrom, said turbine disc including a base portion and a head portion, said head portion of said turbine disc having a cup-shaped cross section and blades therein; the head portion of said impeller disc facing the head portion of said turbine disc so that, with a drive fluid therebetween, rotation of the impeller disc by said drive shaft will cause rotation of said turbine disc and thus said driven shaft; the base portion of said turbine disc defining an annular recess which faces the base portion of said impeller disc, the base portion of said impeller disc including an annular rib which extends into the annular recess in the base portion of said turbine disc, and the facing sides of the base portions of said turbine and impeller discs being shaped to provide at least one flow passage which extends from said annular space to said annular recess at a point radially inwardly of said annular rib, each flow passage functioning to remove pressurized lubricating oil, which has lubricated said cylindrical bearings and said mounting bearings, from said annular space without mixing with said drive fluid.

2. The hydrodynamic power transmission unit as defined in claim 1 wherein said driven shaft includes a central bore along which pressurized lubricating oil can flow, as well as radial passages for delivering the pressurized lubricating oil from said central bore to said annular space between said drive and driven shafts.

3. The hydrodynamic power transmission unit as defined in claim 1 wherein the facing sides of the base portions of said turbine disc and said impeller disc are shaped to provide a single annular flow passage which extends between said annular space and said annular recess.

4. The hydrodynamic power transmission unit as defined in claim 1 wherein said turbine disc is located within said housing, a drainage chamber being formed between said turbine disc and said housing, and wherein the base portion of said turbine disc includes circumferentially elongated ports which communicate between said annular recess and said drainage chamber to remove pressurized lubricating oil from said annular recess.

5. The hydrodynamic power transmission unit as defined in claim 4 wherein said circumferentially elongated ports increase in cross section as they extend from said annular recess to said drainage chamber.

6. The hydrodynamic power transmission unit as defined in claim 1 wherein each flow passage includes a first radial portion and a second angled portion.

7. The hydrodynamic power transmission unit as defined in claim 1 including a cover which extends from the periphery of the head portion of the turbine disc over and around the impeller disc to form an annular chamber for drive fluid, and wherein an injector nozzle removably extends through an opening in said cover to supply metered quantities of drive fluid to said annular chamber.

8. The hydrodynamic power transmission unit as defined in claim 1 wherein each said flow passage provides a cross section which increases as it extends from said annular space to said annular recess.

9. A hydrodynamic power transmission unit which comprises a housing; a hollow drive shaft which is mounted in the housing for rotation; a driven shaft which extends into the housing and is mounted on mounting bearings so as to be rotatable with respect thereto, said driven shaft extending through and being concentric with said drive shaft so as to provide an annular space therebetween; a number of cylindrical bearings positioned in said annular space between said drive shaft and said driven shaft; an impeller disc which is connected to said drive shaft to extend radially outwardly therefrom, said impeller disc including a base portion and a head portion, said head portion of said impeller disc having a cup-shaped cross section and blades therein; and a turbine disc which is connected to said driven shaft to extend radially outwardly therefrom, said turbine disc including a base portion and a head portion, said head portion of said turbine disc having a cup-shaped cross section and blades therein; the head portion of said impeller disc facing the head portion of said turbine disc so that, with a drive fluid therebetween, rotation of the impeller disc by said drive shaft will cause rotation of said turbine disc and thus said driven shaft; the base portion of said turbine disc defining an annular recess which faces the base portion of said impeller disc, the facing sides of the base portions of said turbine and impeller discs being shaped to provide at least one flow passage which extends from said annular space to said annular recess, each said flow passage including a first radial portion and a second angled portion and each flow passage functioning to remove pressurized lubricating oil, which has lubricated said cylindrical bearings and said mounting bearings, from said annular space without mixing with said drive fluid, the head portions of said impeller and turbine discs defining an imaginary plane therethrough, the annular recess of the base portion of said impeller disc being on the impeller disc side of the imaginary plane, the radial portion of each flow passage communicating with the annular space between said drive and drive shafts on the impeller disc side of the imaginary plane and their angled portion communicating with the annular recess on the turbine disc side of the imaginary plane.

* * * * *